(No Model.)  2 Sheets—Sheet 1.
T. C. DODSWORTH.
CULTIVATOR ATTACHMENT FOR TWO WHEELED PLOWS.
No. 246,666.  Patented Sept. 6, 1881.
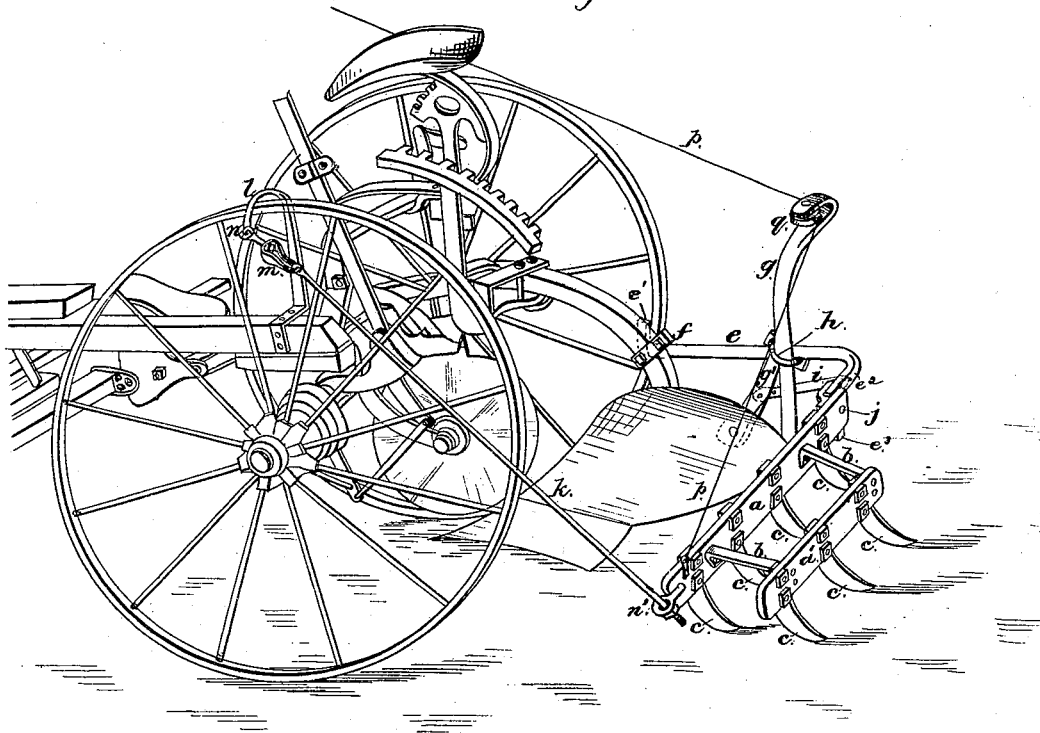
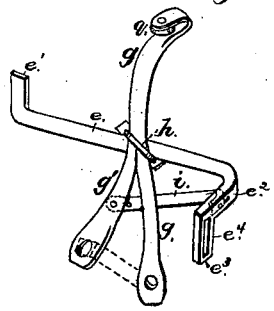
Witnesses:
Jas. E. Hutchinson.
Howell Bartle.
Inventor.
Thos. C. Dodsworth
by Johnson and Johnson
Attys (No Model.) 2 Sheets—Sheet 2.
T. C. DODSWORTH.
CULTIVATOR ATTACHMENT FOR TWO WHEELED PLOWS.
No. 246,666. Patented Sept. 6, 1881.
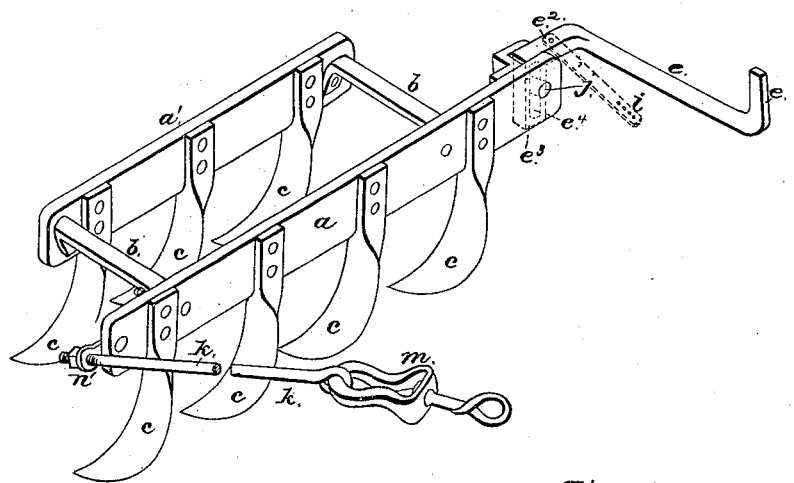
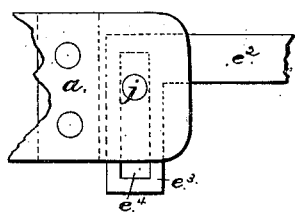
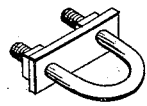
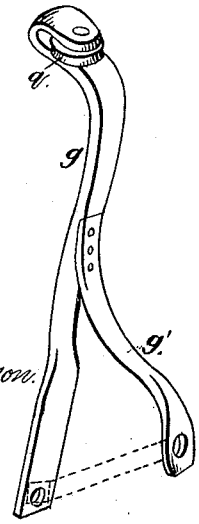
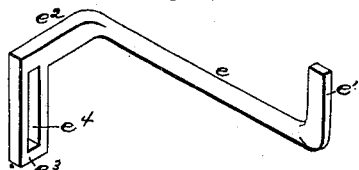
Witnesses.
Jas. E. Hutchinson.
Howell Bartle.
Inventor.
Thos. C. Dodsworth,
by Johnson and Johnson
Attys

UNITED STATES PATENT OFFICE.

THOMAS C. DODSWORTH, OF OTTAWA, KANSAS, ASSIGNOR OF ONE-THIRD TO ATKINSON H. SELLERS, OF SAME PLACE.

CULTIVATOR ATTACHMENT FOR TWO-WHEELED PLOWS.

SPECIFICATION forming part of Letters Patent No. 246,666, dated September 6, 1881.

Application filed March 9, 1881. (No model.)

*To all whom it may concern:*

Be it known that I, THOMAS CHARLES DODSWORTH, a citizen of the United States, residing at Ottawa, in the county of Franklin and State of Kansas, have invented new and useful Improvements in Cultivator Attachments for Two-Wheeled Plows, of which the following is a specification.

My invention relates to improvements in cultivator attachments for plows for cutting, breaking, and smoothing the soil as it is turned by the plow.

My improvement relates more particularly to the employment of such a cultivator attachment with a sulky or two-wheeled plow, to which it is connected and braced so as to follow at the mold-board side thereof, to conform to the surface of the soil, to be adjusted to suit the run of the plow, and adapted to be turned up and supported in a folded position when not in use and in going to and from the field.

Referring to the accompanying drawings, Figure 1 represents a view in perspective of a sulky-plow with my cultivator attachment; Fig. 2, the cultivator attachment disconnected from the plow; Fig. 3, a detail of the hinged end of the cultivator-frame; Fig. 4, one of the attaching-clips; Fig. 5, the forked standard; Fig. 6, the angular bar which carries the toothed frame, and Fig. 7 the forked standard and angular bar as they are united and braced.

I prefer to use a cultivator-frame of two parallel bars, $a$ $a'$, united by strong cross-bars $b$ $b$, and provided with teeth $c$ $c$, bolted to the bars $a$ $a'$ at suitable distances apart, and which are formed with cutting-edges curving backward for cutting and dividing the sods and trashy soil, and to clear themselves so that they do not collect trash. Harrow-teeth are used for mellow and well-cleared ground; or I may use rearwardly-curved cutting-teeth on the front bar, $a$, and straight harrow-teeth on the rear bar. The length of this frame is sufficient to take in the turning of the plow, and the teeth are about nine inches long, and, as they follow the plow on the mold-board side, cut and break and level the loose soil turned at the plowing of each furrow. I may, however, use any form and construction of harrow. The front bar, $a$, of the frame is attached to the plow so as to extend therefrom in rear of and at the mold-board side.

A horizontal L-shaped or curved bar serves to connect the toothed frame with the plow, the part $e$ of said bar terminating in a bend, $e'$, by which it is secured to the standard of the plow by means of a clip, $f$, and clamp-nuts, while the part $e^2$, having a slotted hinged connection with the bar $a$, is long enough to bring such hinge in position to allow the cultivator-frame to be turned up and supported out of the way at the mold-board side. The angular bar is supported by a forked standard, $g$, secured to and rising from the heel of the landside, and held firmly by a brace, $g'$, secured to the inner side of the mold-board by the same bolt and nut which secure the cross-brace extending from the landside. The standard crosses the bar $e$, and is firmly secured to it by a clip, $h$, and clamping-nuts, while a brace, $i$, connects the brace $g'$ with the part $e^2$ of the angular bar, thereby firmly securing and bracing the angular bar and its supporting-standard to the plow-beam and to the plow. The part $e^2$ of the angular bar terminates in a part, $e^3$, having a slot, $e^4$, about four inches long, through which a strong bolt, $j$, passes to connect the inner end of the toothed bar $a$ and form the hinge, upon which it has a limited vertical movement, and upon which the cultivator-frame can be turned up and supported against the standard. The brace $g'$ has holes by which to adjust its connection with the standard-brace to suit the adjustment of the clips upon the beam and the standard $g$. The end of the toothed bar $a$ is forked to form a guide for the slotted end $e^3$ of the bar $e$, and through which the hinge-pin $j$ is riveted. The angular bar may be secured to the inner or the outer side of the beam and standard; but it will be more in the line of the draft on the outer side of the beam.

The outer end of the cultivator-frame is connected by a draft-rod, $k$, to an arm, $l$, secured to the rear end of the tongue, and, curving over the wheel and downward a short distance, terminates in a hook, $n$, for a swivel-connection, $m$, with said draft-rod, while the other end of said rod passes through an eye, $n'$, in the front toothed bar to allow it to slide therein when raising the toothed frame, and thus give a free connection of these parts.

A rope, $p$, connected to the outer end of the toothed frame, passes over a pulley, $q$, at the top of the standard $g$, and leads to and is fastened to the driver's seat, or to a lever for limiting the descent of the outer end of the cultivator-frame, and by which the driver can raise and turn it up on its hinged end, so that it will fold over and rest upon the top of the standard.

By this construction both ends of the cultivator-frame are free to rise and fall to conform to the inequalities of the ground and to cause it to run easy in rough ground.

The braces $g'$ and $i$ serve to brace and to support the hinged end of the angular bar, while the slot $e^4$ serves also to lessen the vertical strain of the harrow-frame upon said bar.

The attachment is raised with the plow, and the hinge $e^3$ $e^4$ forms a stop or abutment for this purpose.

The attachment may be used with a hand-plow.

I claim in a cultivator attachment for two-wheeled plows—

1. The combination of the cultivator-frame and a two-wheeled or sulky plow with a bar hinged to and connecting the said frame with the beam of the plow, and a standard connected with the plow in rear of the beam and secured to and supporting the said frame-connecting bar, substantially as described, for the purpose specified.

2. The combination of the cultivator-frame, a two-wheeled or sulky plow, a bar hinged to and connecting said frame with the plow-beam, and a supporting-standard of said plow, substantially as described, with a draft-rod connected with the outer end of the cultivator-frame and with the wheeled frame, substantially as described, for the purpose specified.

3. The combination of the cultivator-frame and a two-wheeled or sulky plow with a connecting-bar, a supporting-standard for said bar, and the draft-rod $k$, the said bar being provided with a vertical slot, $e^4$, for the joint-pin $j$ of the cultivator-frame, substantially as described, for the purpose specified.

4. The combination of the cultivator-frame and a two-wheeled or sulky plow with the angular bar $e$ $e'$ $e^2$, the standard $g$ $g'$, the connecting-brace $i$, the clamping-clips $f$ $h$, and the draft-rod, the said cultivator-frame and angular bar being connected by a hinge-pin, $j$, and the several parts being adjustable, substantially as described, for the purpose specified.

5. The combination of the cultivator-frame and a two-wheeled plow with a bar, $e$, hinged to and connecting said frame with the plow-beam, a standard, $g$, of the plow, supporting said bar, the draft-rod $k$, connecting the outer end of the cultivator-frame with the plow-frame, and the cord $p$, having a pulley-connection with said standard and leading from the outer end of said frame to the driver's seat, substantially as described, for the purpose specified.

6. A cultivator attachment for plows consisting of the cultivator-frame, the angular or curved bar $e$, its supporting-standard $g$, the draft-rod $k$, and the supporting and lifting cord $p$, the said frame and angular bar being connected by a vertical slot, $e^4$, and pin-joint $j$, substantially as described, for the purpose specified.

In testimony whereof I have hereunto set my hand in the presence of two subscribing witnesses.

THOMAS C. DODSWORTH.

Witnesses:
THOS. I. WESTFALL,
S. L. PATRICK.